Oct. 10, 1933.  R. C. STOLTE  1,929,796
FLEXIBLE SPRING SHACKLE MOUNTING
Filed May 29, 1929
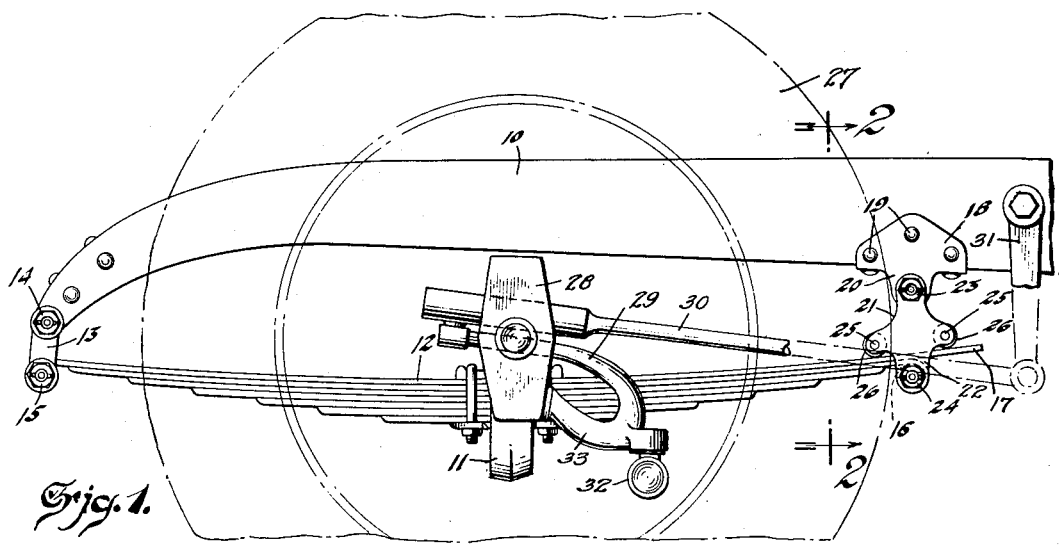
Fig. 1.
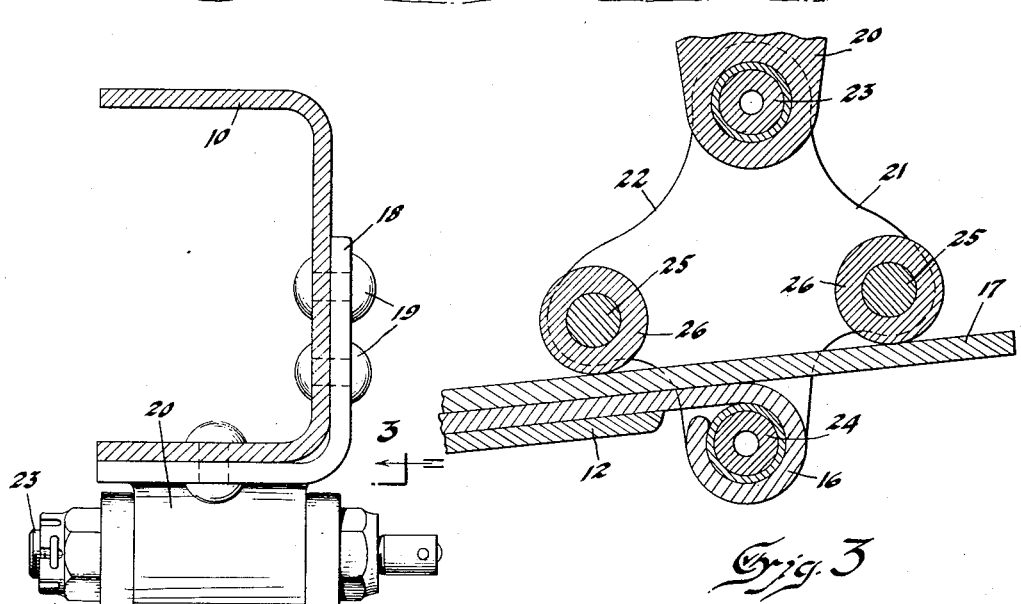
Fig. 3
Fig. 2
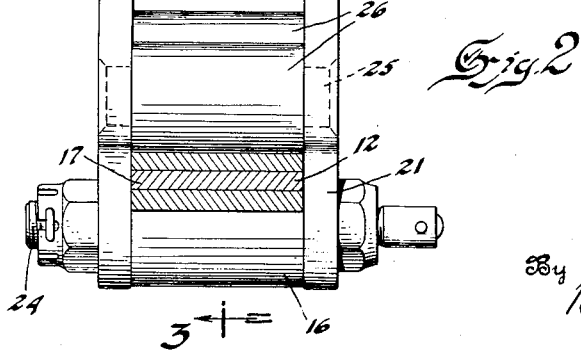
Inventor
Richard C. Stolte
By Blachmore, Spencer & Huth
Attorneys Patented Oct. 10, 1933

1,929,796

UNITED STATES PATENT OFFICE 1,929,796

FLEXIBLE SPRING SHACKLE MOUNTING

Richard C. Stolte, Lansing, Mich., assignor to General Motors Corporation, Detroit, Mich., a corporation of Delaware Application May 29, 1929. Serial No. 367,098

6 Claims. (Cl. 267—48)

In a well constructed automotive vehicle, which is provided with semi-elliptic front load-carrying leaf springs, which are connected at their front ends to the side members of the chassis frame by pivot bolts and at their rear ends to the side members of the chassis frame by shackles, steering wheel kick results principally from three causes, viz, front wheel tramp, front wheel shimmy, and the movement of the road wheel which is carried by the steering knuckle which carries the steering arm when it encounters a bump in the road. Front wheel tramp and front wheel shimmy, in themselves, without regard to their effect on steering, are highly objectionable.

Steering wheel kick, which results from the causes mentioned above, front wheel tramp and front wheel shimmy, can be greatly reduced, if not entirely eliminated, by connecting the front end of the front spring on the side of the vehicle on which the steering arm is provided on the steering knuckle to the chassis frame by means which allows a limited amount of resiliently opposed movement of the spring and the adjacent end of the front axle longitudinally of the spring. It is, however, preferable to shackle the front springs at their front instead of their rear ends, and to secure the rear end of the spring on the side of the vehicle on which the steering arm is provided on the steering knuckle to the chassis frame by means which allows a limited amount of resiliently opposed movement of the spring and the adjacent end of the front axle longitudinally of the spring.

My invention relates generally to devices for connecting an end of a leaf spring to a supporting or supported member so as to allow a limited amount of resiliently opposed movement of the spring longitudinally of itself, and particularly, to such a device which is peculiarly adapted for use in connecting an end of the front spring, which is located on the side of the vehicle on which the steering arm is provided on the steering knuckle, to the chassis frame so as to eliminate steering wheel kick, front wheel tramp and front wheel shimmy.

The invention resides in the provision of a device for connecting an end of a leaf spring to the frame of an automotive vehicle in such a manner as to cause distortion of the spring longitudinally upon movement of the spring longitudinally of itself.

For a better understanding of the nature and the objects of the present invention, reference is made to the following specification in which is described the preferred embodiment of my invention which is illustrated in the accompanying drawing.

In the drawing:

Figure 1 is a view showing, in side elevation, the front end of the steering side of the chassis of an automotive vehicle.

Figure 2 is an enlarged view taken as indicated by the line 2—2 of Figure 1.

Figure 3 is a fragmentary section taken on the line 3—3 of Figure 2.

In the drawing, the reference character 10 indicates the chassis frame of an automotive vehicle, whose front end is supported by dirigible wheels 27 through steering knuckles 28, an axle 11 and semi-elliptic leaf springs 12. On the steering knuckles 28, there are provided arms 33 which are interconnected by a tie rod 32 and on one of which there is provided an extension 29 which is connected to a steering gear (not shown) through a drag link 30 and an arm 31. At its front end, each of the springs 12 is connected to the front end of the chassis frame by means of a shackle 13, which is connected to the adjacent side member of the chassis frame by means of a pivot bolt 14 and to the spring by means of a pivot bolt 15.

The eye 16 at the rear end of the load-carrying spring 12 on the side of the vehicle on which the steering arm is provided on the steering knuckle is formed on the second leaf from the top and the top leaf 17 is made of sufficient length to extend a substantial distance outwardly beyond the eye. To connect the rear end of this spring to the adjacent side member of the chassis frame, there is provided a bracket 18, which is secured to the side member of the frame by rivets 19, and on which is formed a depending lug 20.

The shackle 21 consists of a pair of generally cruciform links 22, of which the upper ends of the vertical arms are disposed on opposite sides of the lug 20 and pivotally connected thereto by a pivot bolt 23. The lower ends of the vertical arms of the shackle links are disposed on opposite sides of the spring 12 and are connected thereto by means of a pivot bolt 24 which extends through the links and the eye 16 of the spring. The outer ends of the cross arms of the shackle links are connected by rivets 25 on which are journalled rollers 26 which, when the spring 12 is loaded under normal conditions, bear rather lightly on the upper side of the top leaf 17.

While vertical forces applied to the shackles 21 through the spring 12 will have no tendency to cause it to swing about the pivot 23 through which it is connected to the bracket 18, any movement of the spring longitudinally of itself will tend to cause the shackle to swing about the pivot 23. Any such movement of the shackle will cause one of the rollers 25 to bear more heavily than the other on the upper leaf 17 of the spring 12 and the leaf 17 to be bent between the pivot bolt 24 and the roller 26 which bears most heavily against it. The leaf 17 will resiliently oppose any force tending to bend it and consequently the movement of the spring longitudinally of itself will be resiliently opposed and steering wheel kick, front wheel tramp and front wheel shimmy will be eliminated.

Although I have shown and described a preferred embodiment of my invention, it is to be understood that this has been done merely by way of example and not by way of limitation, and that the scope of my invention is to be limited only by the appended claims.

I claim:

1. In an automotive vehicle which includes a chassis frame, an axle, steering knuckles connected to opposite ends of the axle, a steering arm secured to one of the steering knuckles, and semi-elliptic leaf springs for supporting the chassis frame from the axle: means for connecting the spring on the steering side of the vehicle to the side member of the chassis frame, including a shackle pivotally connected at one end to the chassis frame and at its opposite end to one end of the spring, a shackle pivotally connected at one end to the chassis frame and at its opposite end to the other end of the spring, and means associated with one of the shackles so as to cause distortion of the spring upon longitudinal movement thereof.

2. The invention claimed in claim 1 in which the last-mentioned means is associated with the rear shackle.

3. In an automotive vehicle, a chassis frame, a load-carrying leaf spring, a free swinging shackle between one end of the spring and the frame, and a shackle pivotally connected to the other end of the spring and to the chassis frame, and having portions adapted to bear against portions of the spring on opposite sides of its pivotal connection therewith so as to cause distortion of the spring when the spring moves longitudinally of itself.

4. In an automotive vehicle, a frame, a load-carrying leaf spring, an eye formed on an intermediate leaf of the spring, a shackle pivotally connected to the frame, a pivot member extending through the shackle and the eye of the spring, and means on said shackle adapted to bear against the upper leaf of the spring so as to cause distortion thereof when the spring moves longitudinally of itself.

5. In an automotive vehicle, a chassis frame, a load-carrying leaf spring, an eye formed on an intermediate leaf of the spring, a cruciform shackle, a pivot member extending through one end of one arm of the shackle and the frame, a pivot member extending through the opposite end of the same arm of the shackle and the eye of the spring, members extending through the opposite ends of the other arm of the shackle, and rollers journaled on the last-mentioned members and bearing against the upper face of the upper leaf of the spring.

6. In a motor vehicle, a chassis frame, a load supporting spring therefor, a free swinging shackle between the frame and one end of the spring, and a driving connection between the frame and the other end of the spring, said last mentioned connection being normally immovable but capable of movement to cushion road action on the vehicle steering mechanism, and including a link pivotally connected at opposite ends to the spring and frame and provided with portions adapted to bear on the spring on opposite sides of its connection thereto, upon any tendency of the spring to move longitudinally of itself, to flex the spring and thereby make use of its elasticity to cushion such movement.

R. C. STOLTE.